UNITED STATES PATENT OFFICE.

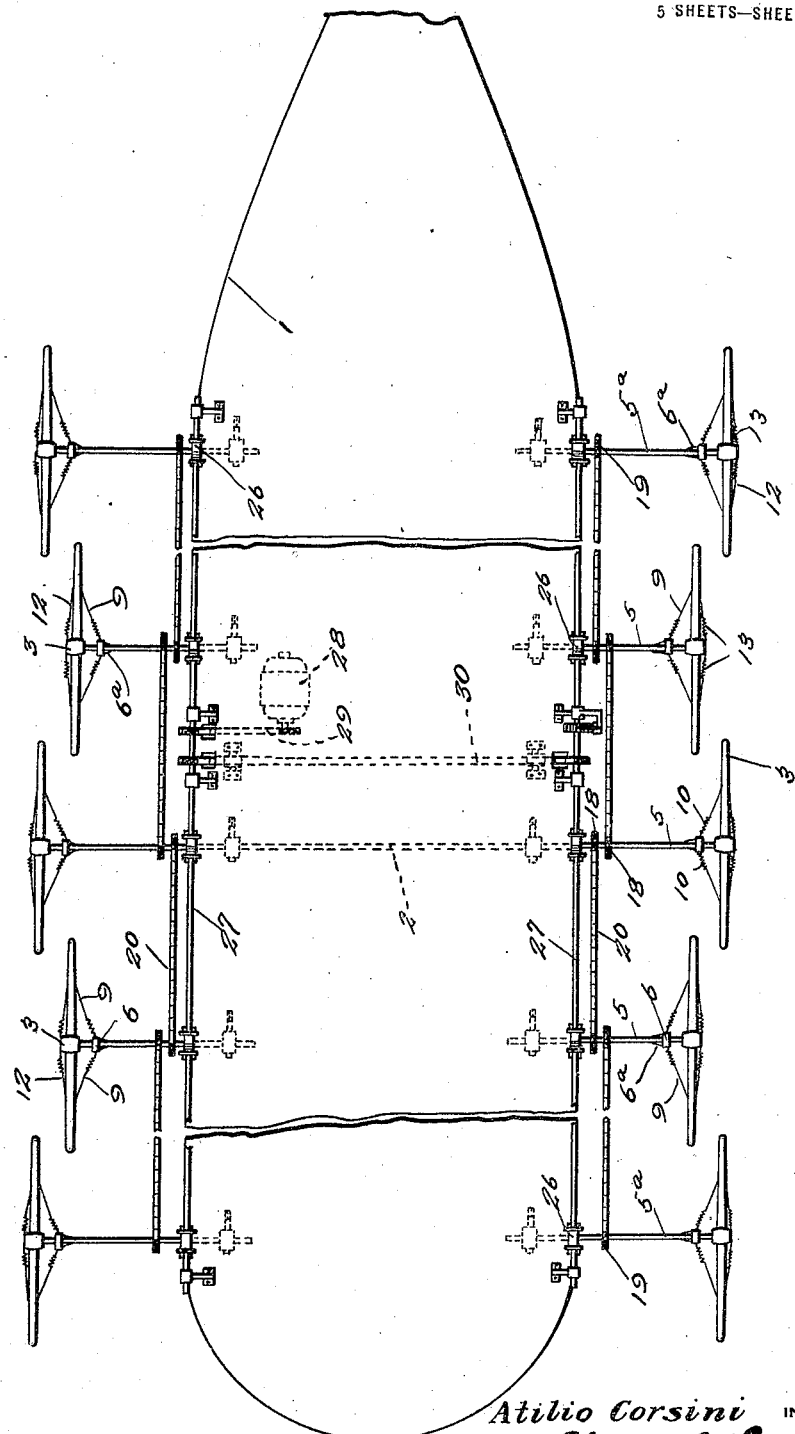

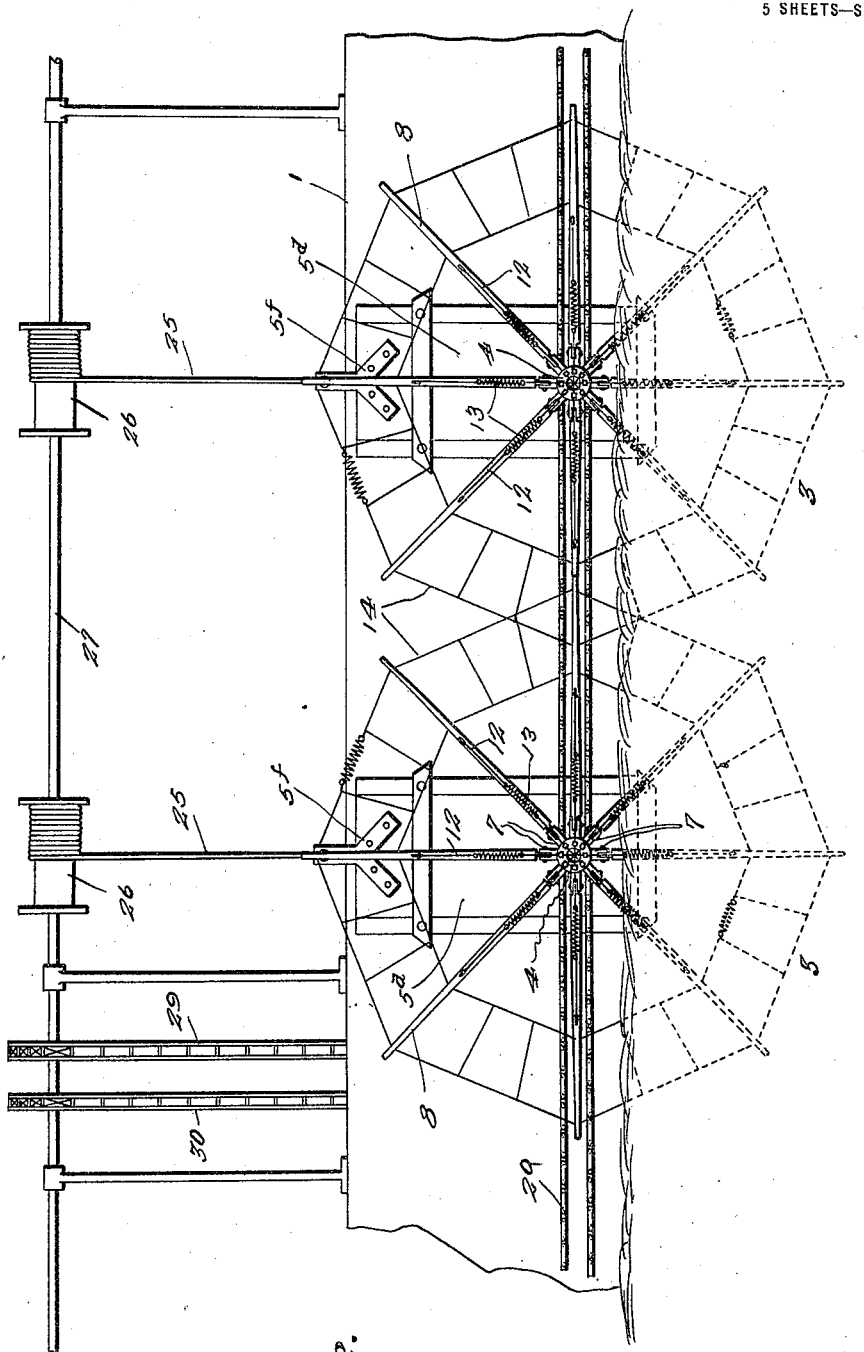

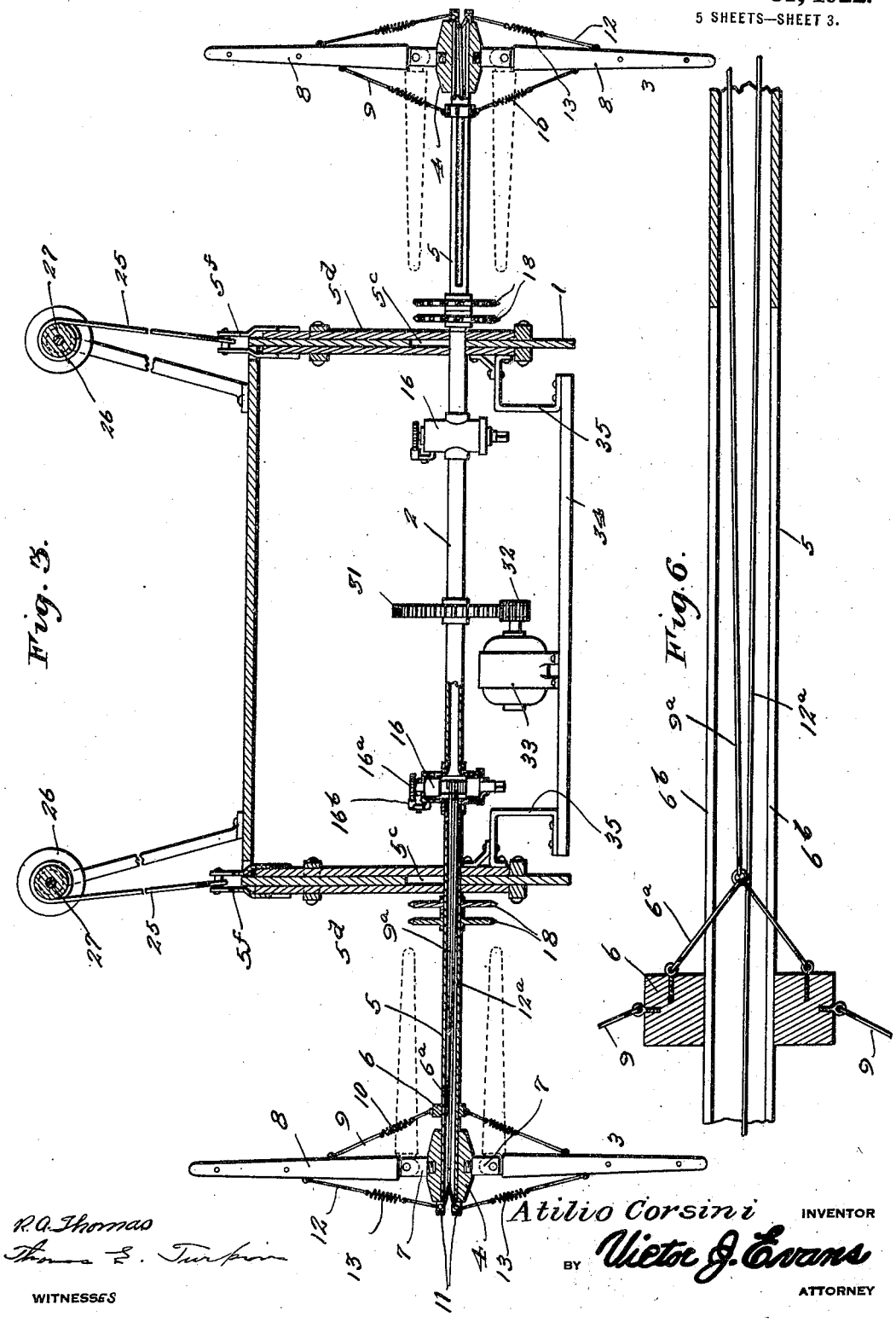

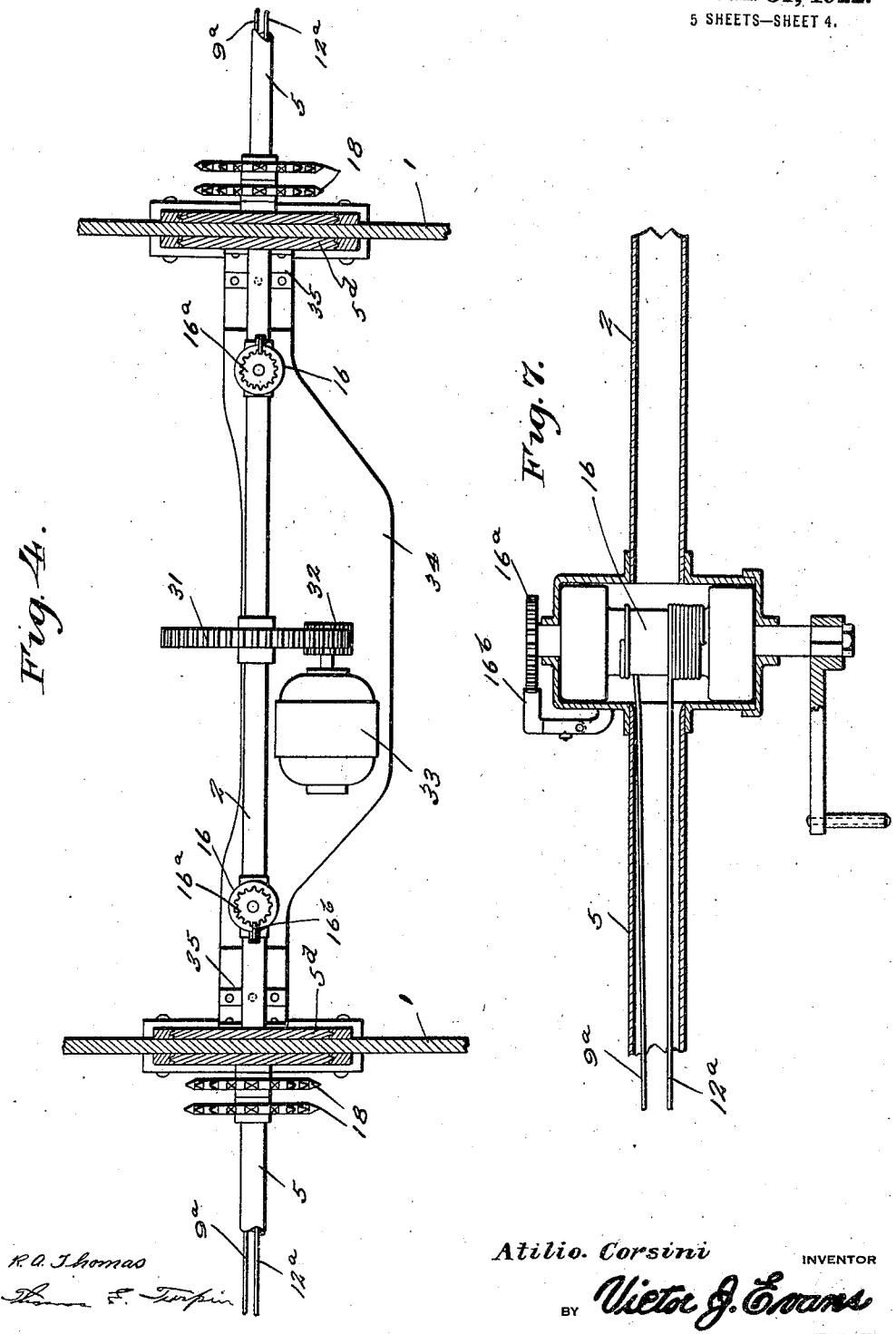

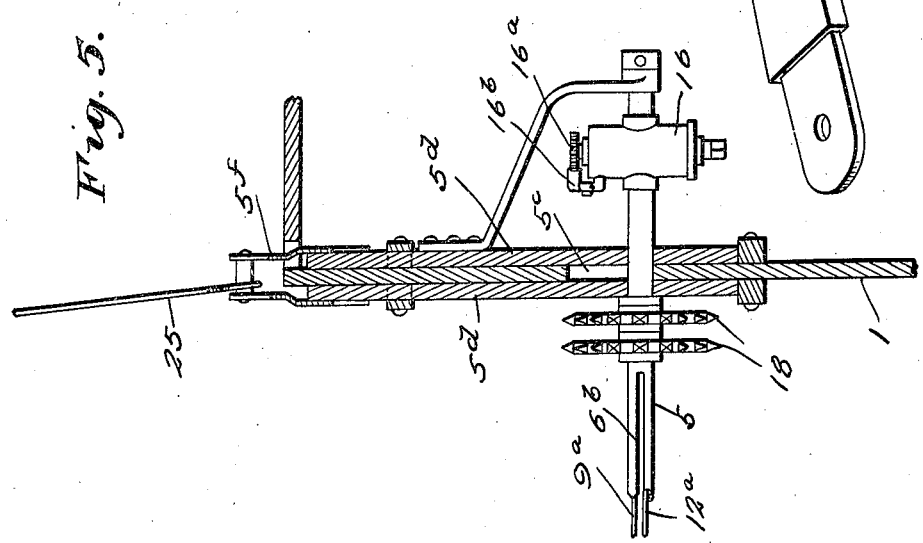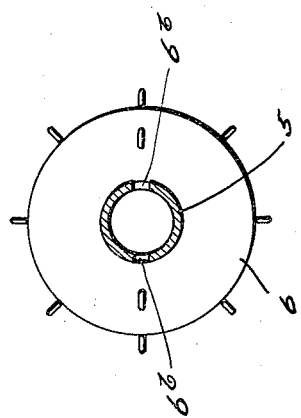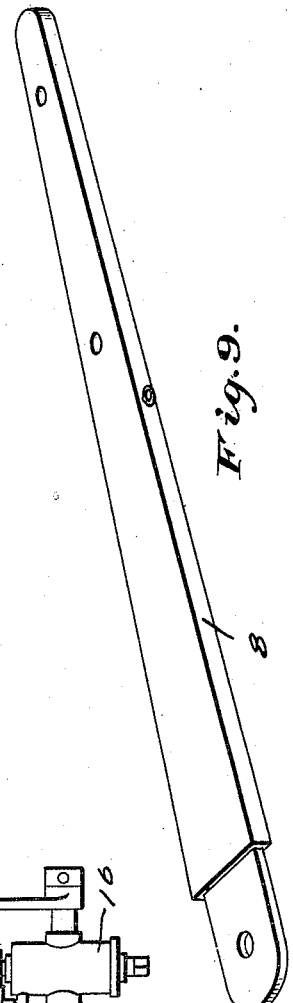

ATILIO CORSINI, OF DETROIT, MICHIGAN.

TORPEDO GUARD.

1,405,294. Specification of Letters Patent. Patented Jan. 31, 1922.

Application filed June 24, 1921. Serial No. 480,126.

*To all whom it may concern:*

Be it known that I, ATILIO CORSINI, a citizen of the United States, residing at Detroit, in the county of Wayne and State of Michigan, have invented new and useful Improvements in Torpedo Guards, of which the following is a specification.

My present invention has to do with the protection of ships from torpedoes fired by submarines or other vessels; and it has for its general object to provide guard means embodying such a construction and relative arrangement of parts that it is adapted to be quickly and easily installed on a vessel hull without entailing material change in the construction of the hull.

Another object of the invention is the provision of an efficient guard means susceptible of being propelled, with the result that it is calculated to accelerate rather than retard the progress of a vessel.

Another object is the provision of guard means constructed and arranged in such manner that it may be accommodated to the draft of a vessel, so as to adequately protect the vessel hull when the same is light and also when the same is loaded and disposed deep in the water.

Another object is the provision of hull protecting means that is extremely light in weight and is therefore not likely to materially increase the load carried by a ship.

Other objects and advantageous features of the invention will be fully understood from the following description and claims, when the same are read in connection with the drawings, accompanying and forming a part of this specification, in which:—

Figure 1 is a plan view, illustrating my novel guard means as properly arranged relative to a vessel hull; the hull being shown diagrammatically.

Figure 2 is an enlarged fragmentary side elevation of the same.

Figure 3 is an enlarged detail transverse section with some parts in elevation.

Figure 4 is an additional detail transverse section.

Figure 5 is a detail vertical section illustrative of the means whereby the wheels and their complementary shafts may be raised and lowered, as occasion demands.

Figures 6, 7, 8 and 9 are views of details hereinafter referred to.

Similar numerals of reference designate corresponding parts in all of the views of the drawings.

In order to install my novel guard means on a ship hull, the hull is suitably bored for the reception of a transverse drive shaft 2, which extends slightly beyond the opposite sides of the hull, as illustrated. The said shaft 2 is connected in the manner shown or in any other suitable manner with the motor of the vessel, so that motion may be transmitted from said motor to the several wheels embodied in my improvement, as hereinafter described and claimed.

The wheels which are numbered 3 are arranged in longitudinal series and lapped relation at opposite sides of and spaced from the hull, Figures 1 and 2, this with a view to precluding the formation of spaces between the wheels such as would enable a torpedo to reach and explode against the side of the hull. The said wheels are identical in construction, and, therefore, a detailed description of the wheels illustrated in detail in Figures 2 and 3 will suffice to impart an exact understanding of all of the wheels. Each wheel is made up of a hub 4, fixed upon a tubular shaft portion 5, which extends transversely through the hub as illustrated, and an annulus 6 slidable upon the tubular shaft and spaced from the inner end of the hub, bifurcated arms 7 fixed to and grouped about the hub, spokes 8 pivoted at their inner ends in the arms 7 and adapted to swing laterally with respect to the sides of the vessel hull, cables 9 interposed between portions of the spokes 8 and the annulus 6 and each including a retractile spring 10, guides 11 mounted in circular series at the outer end of the hub 4, and cables 12 passed around the said guides 11 and thence outwardly to the several spokes 8 to which they are connected, and each including a retractile spring 13. Each wheel also comprises what may be properly designated net work 14, which extends between and is connected to the outer portions of the spokes 8 with a view to increasing the torpedo-excluding capacity of the wheel.

The cables 9 are connected at their inner ends to the slidable annulus 6, and the said annulus 6 is provided with a yoke 6ª, Figure 6, which is movable in longitudinal slots 6ᵇ in the shaft portions and is connected to a cable 9ª. The cables 12 are carried inwardly from the guides 11 and are connected to a cable 12ª extending longitudinally through the tubular shaft portion 5. Said cable 12ª is appropriately connected with a drum 16 as is also the reversely wound cable 9ª. From this it follows that when the drum 16 is rotated in one direction the spokes will be drawn on their centers of movement inwardly with the result that the diameter of the wheel will be diminished, whereas when the drum is rotated in the opposite direction the wheel will be caused to resume its normal and greatest diameter. From this it follows that within certain limits the several wheels 3 may be accommodated to the draft of the vessel hull, and so that each wheel will extend into the water a sufficient distance to enable the several lapped wheels to adequately protect the vessel hull against a torpedo moving on or adjacent to the surface of the water.

At one end the drum 16 is provided with a ratchet disk 16ª for cooperation with a pawl 16ᵇ, designed to prevent casual or retrograde rotation of the drum.

The intermediate shaft portions 5 are each provided with a pair of sprocket gears 18, and the foremost and rearmost shaft portions 5ª are each provided with a single sprocket gear 19. These sprocket gears 18 and 19 are for the engagement of sprocket belts 20, through the medium of which motion is transmitted from the shaft portions 5 that are aligned with the drive shaft 2 to the other shafts 5. The shaft portions 5 in alignment with the drive shaft 2, Figure 3, are connected to and movable vertically with said drive shaft 2. I would also have it here understood that each of the shaft portions 5 and 5ª in front and rear of the drive shaft 2 is disposed laterally to a side of the hull. From this it follows that without interfering with the rotation of the several wheels and the transmission of rotary motion thereto, the wheels may be raised or lowered in company with their respective shaft portions, in order that when deemed expedient the wheels may be raised entirely out of the water and placed in idle positions alongside the hull.

As clearly shown in Figures 3 and 5 the shaft portions 5 and 5ª extend through openings 5ᶜ in the side walls of the vessel hull, and the said shaft portions 5 and 5ª are journaled in vertically movable members 5ᵈ, arranged at opposite sides of the side walls of the hull and serving to carry the shaft portions and also serving for the raising and lowering of the said shaft portions and the wheels carried thereby. Connected to the upper ends of each pair of vertically movable members 5ᵈ are couplings 5ᶠ to which are connected cables 25, designed to be taken on and off of drums 26 on longitudinal shafts 27. The said shafts 27 are driven from an electric motor or other appropriate motor 28 through the medium of the driving connection 29 to one of the longitudinal shafts 27, Figure 1; it being understood in this connection that the last mentioned shaft 27 is connected to the other longitudinal shaft 27 through the medium of the driving connectons 30 clearly illustrated in Figure 1.

All of the shaft portions that carry the protective wheels are driven from the transverse shaft 2, and by particular reference to Figure 3 it will be observed that the shaft 2 is provided with a spur gear 31, and that the said spur gear 31 is connected with a pinion 32 on the armature shaft of an electric motor 33. The said motor 33 is superimposed on and connected to a vertically movable platform 34 which is connected through the medium of brackets 35 with the inner adjacent vertically movable members 5ᵈ with the shaft 2 so that raising or lowering of the said shaft 2 with the shaft portions 5 in alignment therewith will not affect the continuity of the connecton between the motor and the shaft 2.

As illustrated in dotted lines in Figure 3, the spokes 8 may be swung inwardly and secured in substantial parallelism with the shaft portions of the wheels when for any reason it is not desired to use the wheels for protective purposes.

It will be appreciated from the foregoing that my novel guard means is simple and inexpensive in construction and light in weight; also that the said guard means is susceptible of ready installation on ship hulls, such as at present in use, without entailing material change in the construction of the hull. It will further be appreciated that my novel guard means is calculated to accelerate rather than impede the progress of the vessel bearing the same, and that by reason of the lapped relation of the several wheels in each longitudinal series of wheels, the wheels acting in conjunction are adapted to effectively prevent a torpedo fired from a submarine against the broad side of the hull from reaching the hull. On the other hand, a torpedo approaching the side of the hull will manifestly be stopped by the wheels with the result that the torpedo will be deflected away from the hull or will be caught and held in one of the wheels and effectively prevented from exploding against the hull and injuring the same.

The adjustable capacity of the wheels embraced in my novel guard means will be appreciated as important when it is stated that the wheels are most efficient in guarding the hull when the wheels are arranged with their net work 14 disposed to move through the uppermost strata of the water.

I have entered into a detailed description of the construction and relative arrangement of the parts embraced in the present and preferred embodiment of my invention in order to impart a full, clear and exact understanding of the said embodiment. I do not desire, however, to be understood as confining myself to the said specific construction and relative arrangement of parts, since in the future practice of the invention various changes in the form and relative arrangement of the elements may be made within the scope of my appended claims.

Having described my invention, what I claim and desire to secure by Letters-Patent, is:—

1. Means for guarding a vessel hull against torpedoes, comprising a plurality of wheels connected with and carried by the hull in spaced relation to a side thereof, the said wheels being lapped and arranged in a longitudinal series and each wheel being contractible, a shaft complementary to each wheel and connected with the hull, and means intermediate of each wheel and the hull, whereby the wheel may be diminished or increased in diameter.

2. The combination of a vessel hull, a drive shaft mounted in the hull, shaft portions connected with the ends of the drive shaft and capable of moving vertically therewith, other shaft portions connected with the hull and arranged in front and rear of the shaft portions that are connected directly with the drive shaft, wheels mounted on all of said shaft portions and lapped and adapted to turn in the water, driving connections intermediate the wheel bearing shaft portions, a motor connected and movable vertically with the drive shaft, and means to move the drive shaft and shaft portions vertically.

3. The combination of a vessel hull, and lapped wheels arranged in longitudinal series at opposite sides of and in spaced relation to the hull; each of said wheels being contractible as to diameter, power means for rotating the wheels, means for bringing about contraction and expansion of the wheels, means for adjustably fixing the same, and means whereby the wheels may be raised and lowered.

4. A collapsible wheel for the purpose described, comprising a hull, arms extending radially therefrom, spokes pivotally connected to said arms, net work extending between and connected to the outer portions of the spokes, cables interposed between the hub and the spokes and including retractile springs, and means connected with the sides of the spokes opposite to said cables for moving the spokes inwardly.

5. In a torpedo-guarding means, the combination of a tubular slotted shaft portion, a hub fixed thereon and having guides at its outer end, bifurcated arms on the hub, spokes pivoted to said arms, an annulus slidable on the shaft, cables interposed between said annulus and the spokes, and including retractile springs, cables including retractile springs and connected to the outer sides of the spokes and passed around the sheaves and carried through the tubular shaft, a drum, means to fasten the same, a cable connecting the last-named cables and the drum, and a cable connecting the annulus and the drum.

6. The combination with a wall of a vessel hull in which wall is an opening, a shaft portion extending through and movable vertically in said opening, a guard wheel on said shaft portion, vertically movable members arranged at opposite sides of the hull wall and carrying the said shaft portion, and means connected with and adapted to raise and lower the said vertically movable members.

7. The combination of a vessel hull having transverse openings in its side walls, shaft portions extending through and movable vertically in said openings, guard wheels carried by said shaft portions, a shaft interposed between and connected to and movable vertically with said shaft portions, vertically movable members carrying the said shaft portions and arranged at opposite sides of the side walls of the hull, means to raise and lower the said vertically movable members, and a motor connected with the inner of the said vertically movable members and movable vertically therewith and connected with the said interposed shaft.

8. The combination of a vessel hull having transverse openings in its side walls, shaft portions extending through and movable vertically in said openings, guard wheels carried by said shaft portions, a shaft interposed between and connected to and movable vertically with said shaft portions, vertically movable members carrying the said shaft portions and arranged at opposite sides of the side walls of the hull, means to raise and lower the said vertically movable members, a platform, brackets interposed between the inner of the vertically movable members and the platform whereby the platform is movable with the vertically movable members, a motor carried by said platform, and a driving connection intermediate of the motor and the said interposed shaft.

9. In torpedo guarding means for vessels, the combination of a vessel hull, a shaft portion extending through and outwardly beyond one wall of the vessel hull, a wheel carried by said shaft portion and having spokes mounted to swing toward and from the vessel hull and also having means whereby a person within the hull can open or fold the wheel.

10. In torpedo guarding means for vessels, the combination of a vessel hull, a shaft portion extending through and outwardly beyond one wall of the vessel hull, a wheel carried by said shaft portion and having spokes mounted to swing toward and from the vessel hull and also having means whereby a person within the hull can open or fold the wheel; the said last-named means being yielding.

11. In a torpedo guarding means for vessels, the combination of a vessel hull, a shaft portion extending through and outwardly beyond one wall of the vessel hull, a wheel carried by said shaft portion and having spokes mounted to swing toward and from the vessel hull and also having means whereby a person within the hull can open or fold the wheel; the last-named means including cables extending through the shaft portion to the interior of the hull of the vessel.

In testimony where I affix my signature.

ATILIO CORSINI.